C. W. WINTERBOTHAM.
ELECTRICALLY HEATED COOKING STOVE.
APPLICATION FILED MAY 9, 1917.
1,234,991.
Patented July 31, 1917.
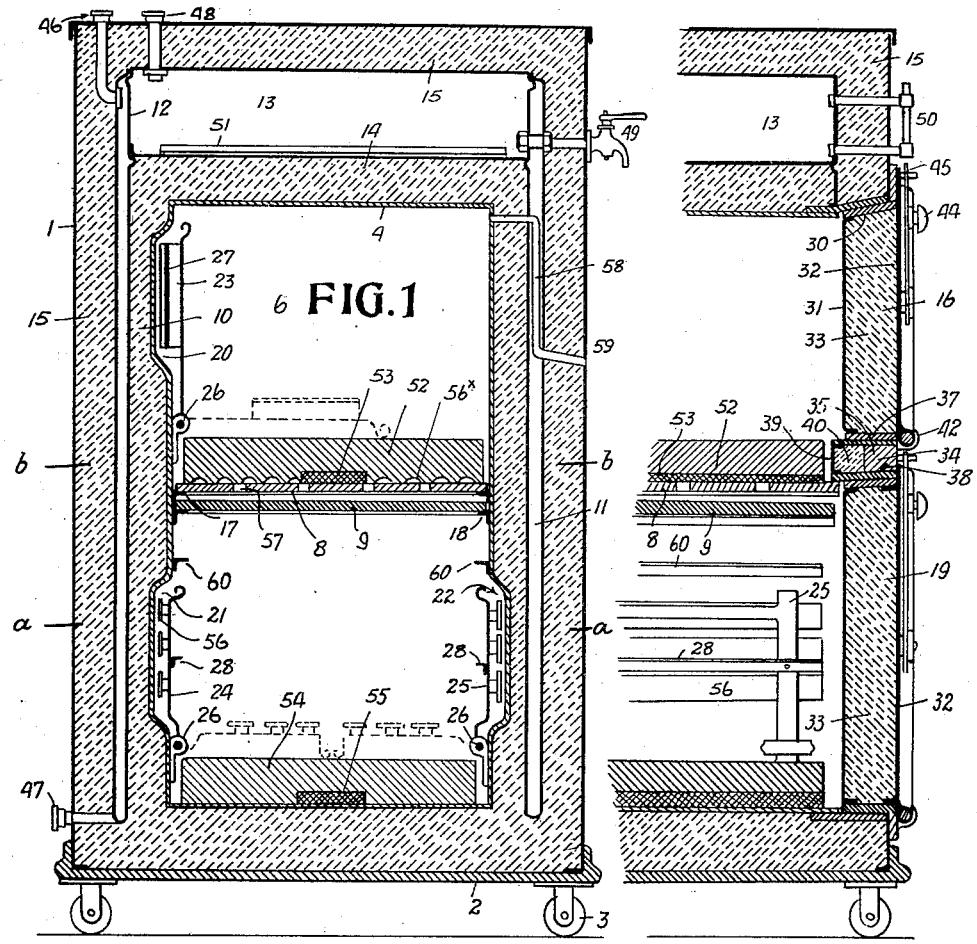
FIG.1
FIG.2
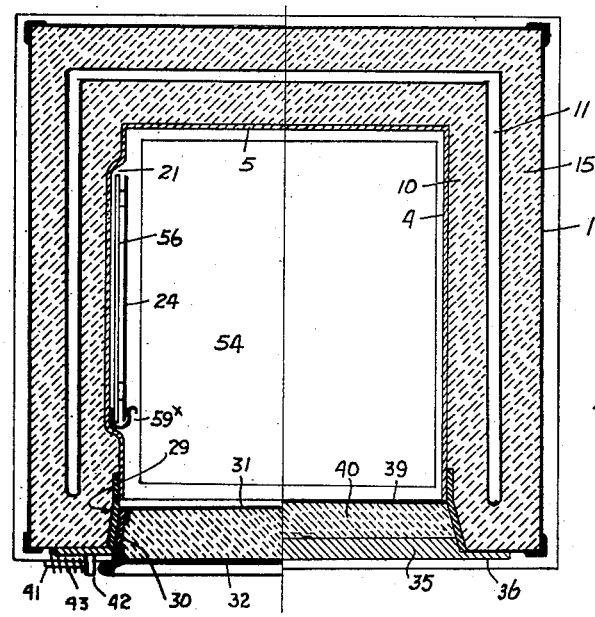
FIG.3
Inventor
Clifford William Winterbotham
by
his Attorney

UNITED STATES PATENT OFFICE.

CLIFFORD WILLIAM WINTERBOTHAM, OF BRIGHTON BEACH, VICTORIA, AUSTRALIA.

ELECTRICALLY-HEATED COOKING-STOVE.

1,234,991. Specification of Letters Patent. Patented July 31, 1917.

Application filed May 9, 1917. Serial No. 167,440.

*To all whom it may concern:*

Be it known that I, CLIFFORD WILLIAM WINTERBOTHAM, subject of the King of Great Britain and Ireland, residing at 107 South road, Brighton Beach, Victoria, Australia, have invented new and useful Improvements in Electrically-Heated Cooking-Stoves, of which the following is a specification.

This invention relates to electric cookers of the type in which a store of heat is maintained permanently in the cooking chamber in a mass of metal constituting a heater element in which it is absorbed from an electric resistance heater through which current flows continuously, and from which it is radiated to the contents of said chamber. Heat radiated from the heater element in this type of cooker maintains the necessary degree of temperature for ordinary cooking operations in the cooking chamber at all times, and heat leakage through the cooking chamber insulation is absorbed in a jacket and utilized for warming or heating water.

The objects of the present invention are to facilitate control of cooking operations in electrically heated cookers, to economize space, to minimize current consumption, to diminish losses by radiation and conduction, to utilize unavoidable heat leakage to best advantage in a water kettle forming part of the structure, to provide for auxiliary heating from units mounted in folding carriers by which said units may be housed in wall recesses when out of use, and generally to improve the structural features of such cookers.

The details of construction of the cooker and various minor features thereof will be particularly described hereinafter with reference to the accompanying drawings, in which—

Figure 1 is a vertical section; Fig. 2 is a partial transverse vertical section, and Fig. 3 shows halved horizontal sections on lines *a—a* and *b—b* Fig. 1.

The outer shell or casing 1 may be of sheet iron or of cast iron, preferably enameled exteriorly, and carried on a base plate 2 which is usually fitted with runners 3. The linings 4 and 5 of the upper chamber 6 and lower chamber 7 are of sheet or cast iron which also may be enameled interiorly. The chambers are partitioned from each other by a perforated metal plate 8 and an asbestos board or other suitable effective or partial insulator 9. These diaphragms are supported on ledges 17 and 18, and are either or both removable. On all sides, except the front, both cooking chambers are completely embedded in slag wool or other suitable insulation 10. A cellular chamber 11, forming an oil jacket, surrounds the insulation 10 on three sides, and extends some distance above the upper chamber 6; the upper part 12 of its inner wall forms three sides of the water kettle 13 which is located directly above the chamber 6, but is separated from the lining 4 of said chamber by insulation 14 which is continuous with the insulation 10. An outer body of insulation 15 surrounds the oil jacket 11 and extends over the top and front of the water kettle 13. The shell 1 is thus completely lined with insulating material, except at the front of the cooking chambers 6 and 7, the doors of which are, however, also heat insulated. The plate 8 may be lifted out, and the board 9 slid out when the doors 16 and 19 are opened. Open pockets 20, 21 and 22 are formed in the chamber linings to accommodate the supplementary heaters 23 and 24 and 25. The frames of these heaters are mounted on hinge supports 26 on which they may be folded down onto the heat storage blocks as shown in dotted lines in Fig. 1, or folded back into said pockets when not required for underneath heating purposes. Stops and clips 59 are fitted to prevent these elements 23, 24 and 25 from contacting with the chamber linings 4 and 5 and for holding the frames in the upright position. 27 is a metal shield plate fixed over but clear of the upper element 23 to protect it from fouling with spilled grease or the like. On the rear side of the frames of the elements 24 and 25 in the lower chamber, shelf ledges 28 are fitted to support a grid or shelf and permit same to be slid into and out of position when the lower door 19 is open and said frames are in the vertical position; this arrangement is adopted only when two half frames, one on either side of the chambers, are fitted as shown in Fig. 1. When only one supplementary heater element is fitted in the lower chamber 7, said element is arranged to fold up against the back wall of the chamber in the same manner as the element 23 in the upper chamber 6.

The door jambs 29 are formed of asbestos board and are splayed at top and sides to facilitate the making of tight joints when the doors 16 and 19 are closed and to offer clearance for the sweep of the doors in opening and closing. The tops and side edges of the doors are similarly splayed and are also formed of asbestos board 30 which unites their inner metallic linings 31 and their metallic facings 32, the interior spaces 33 being packed with slag wool or other suitable heat insulator. The midrib 34 is constructed of a metal bar 35 integral with the door frame 36 which with the contained doors forms a part of or the whole of the front side of the cooker; the bar 35 is connected by asbestos boards 37 and 38 to the metal shell 39 forming the inner part of the midrib, the core 40 of which is packed with slag wool.

Three or more small blocks of earthenware are set on the base plate under the bottom of the lining to carry the weight of the cooking chambers, as the slag wool insulation is not sufficiently rigid to offer the necessary support for this purpose.

The doors 16 and 19 are supported by horizontal pintles 41 working in horizontal eye lugs 42 on the frame 36, and wound helical springs 43 are fitted to partially counterbalance the weight of the doors and so make their manipulation easy. Hanger chains (not shown) are also fitted to each door to support its weight when it is fully opened down to the horizontal position, in which position it serves as a shelf conveniently placed for facilitating the insertion of articles into the cooker chambers and the withdrawal of articles therefrom. Each door is fitted with a handpiece 44 and a latch 45. 46 is a filler cap and air expansion vent in the top of the oil jacket 11, and 47 a capped drain pipe from the foot of said jacket. 48 is a filler cap and air expansion vent in the top of the kettle 13, 49 hot water cock, and 50 gage glass. 51 is a stiffening rib, of which two or more may be fitted, to prevent sagging of the kettle bottom.

The upper heat storage block 52 rests on the perforated metal diaphragm plate 8 in the bottom of the upper chamber 6 and carries in a pocket on its bottom side an electric heater unit 53.

The supplementary heater element 23 consists of one or more heater units mounted on a frame which may be moved about its pivotal support 26, so that it may be swung up into the vertical position where it insets in the wall pocket 20 as shown in Fig. 1, or may be swung down to horizontal position over the heat storage block, as shown in the dotted lines in the same figure, to provide bottom heating in the chamber 6 to supplement the heat radiated into said chamber from the storage block 52. The heater units 23 carried on the frame are covered by a thin metal plate 27 which protects them from fouling or injury when the element is in the horizontal position, and serves also to keep them from making contact with the metallic liner 4 when the element is in the vertical position. As also in the case of the supplementary heater units 24 and 25 hereinafter described, the unit 23 may be used in its vertical position to deliver heat into the upper part of the chamber 6, but ordinarily it will be used when brought down to the horizontal position, as shown in the dotted lines. For roasting or baking purposes, however, the vertical position of the supplementary heaters permits the application of heat at the sides of the substances undergoing cooking and thereby facilitates cooking in certain cases to better advantage than when underneath heat only is available. The upper chamber 6 is intended to be used for boiling, stewing or other cooking operations, in which liquids or greasy matter are liable to be spilled or are liable to overflow. The lower chamber 7 is usable to better advantage for baking and like purposes in which risk of fouling the elements is not ordinarily present. The heat storage block 54 in the lower chamber 7 is fitted with an electrical heater unit 55 contained in a recess formed in its under side, and it rests on the bottom of said lower chamber 7. The supplementary heater units 24 and 25 consist of open frames adapted to be swung into vertical or horizontal position as shown in full and dotted lines respectively and when in the vertical position to set back into the recesses 21 and 22 formed in the lining 5. Upon each of these frames one or more electrical heater units 56 are mounted, the snap clips 59 preventing these units coming into electrical contact with the chamber wall 5. The units in the supplementary heaters 23, 24 and 25 are wired on a circuit independent of the elements 53 and 55, so that they may be used or left idle as required.

The under side of the upper storage block 52 is corrugated or otherwise formed as shown at 56 to allow hot air of vapor which passes through perforations 57 in the plate 8 to pass into the upper chamber 6. 58 is a vapor vent forming a heat trap. It is a pipe brought out of the upper chamber 6 near the top thereof, carried downwardly through the jacket 11, and then outwardly to an exit hole 59 in the outer wall 1. Heat is absorbed from vapors and gases passing out through this pipe 58 by the oil contained in the jacket 11, and said heat is thence conveyed through said oil to the walls of the kettle 13 and there utilized to heat water.

The heater elements 53 and 55 are permanently on circuit so as to maintain the stove always at predetermined uniform temperature and to supply heat in quantity normally required for ordinary cooking operations. They suffice to maintain the temperature of the cooker at a predetermined point high enough to insure a sufficient storage of heat in the blocks 52 and 54 and in the metal linings 4 and 5 of the chambers 6 and 7 to meet the ordinary demand for heat cooking purposes. The supplementary elements 23, 24 and 25 are wired through supplementary switches so that in order to meet conditions of heavy demand for heat in either cooking chamber an additional source of heat in excess of ordinary supply will be immediately available.

By withdrawing the insulating diaphragm 9, heat transmission is permitted to occur between the two chambers, so that absorption of heat in one chamber is partly made good to that chamber by heat transfer from the other chamber, upward or downward, as the case may be.

Either heater storage block 52, 54 may be removed bodily after its electrical connections have been freed, without affecting the operation of the other said block. The upper block 52 is carried on the perforated metal diaphragm 8. When said block and the diaphragms 8 and 9 are removed, a one chamber cooker served by heater elements 55, 23, 24 and 25 is obtained.

Heat leakage from either chamber 6 or 7, which is not intercepted by the insulation 10, is absorbed in the oil jacket 11, and convection currents are set up in the oil in said jacket, with the result that heat is transferred to the kettle 13 and the water therein by radiation through the common wall 12. Radiation laterally from the jacket 11 and from the kettle 13 is inhibited by the outer insulation 15. Heat leaking upwardly from the top of the chamber 6 is absorbed directly into the kettle 13.

60 are ledges fitted to either side of the lower cooking chamber 7 and adapted to support trays or racks (not shown).

It is not essential that the cooker be of rectangular form. The features of construction herein described are applicable in a cooker of vertical cylindrical shape.

What I claim as my invention and desire to secure by Letters Patent is—

1. An electrically heated cooker comprising an externally insulated chamber, two spaced independent removably mounted diaphragms traversing said chamber and adapted to divide the same into two compartments, one of said diaphragms being imperforate and a non-conductor of heat and the other diaphragm being perforated and a good conductor of heat, means for heating said compartments independently of each other, and a separate door for each compartment.

2. An electrically heated cooker comprising an externally insulated chamber, a cellular jacket inclosing said insulation on three sides of said chamber and adapted to be heated solely by heat leakage from said chamber, a water kettle having a portion of its shell integral with said jacket, insulation completely inclosing said jacket and kettle, and separate means for heating the upper part and the lower part of said chamber respectively.

3. An electrically heated cooker comprising two chambers one above the other contained within a continuous liner externally heat insulated, two spaced independent removably mounted diaphragms between said chambers, one of said diaphragms being imperforate and a non-conductor of heat and the other diaphragm being perforated and a good conductor of heat.

4. In an electrically heated cooker comprising intercommunicating chambers, electrically heated elements supported on folding grids adapted to be set in horizontal position in the bottom of said chambers respectively or folded back and housed in pockets formed in the linings of said chambers.

5. In an electrically heated cooker in which a store of heat is maintained by means of electrically heated heat storage blocks, supplementary means for heating the chambers of said cooker, consisting of electrically heated units carried on pivoted grids adapted to be folded back and housed in pockets in the chamber walls.

6. In an electric cooker, the combination of two metal lined cooking chambers open at one side, one superposed over the other with a removable diaphragm between them, a water kettle located above the upper cooking chamber and heavily heat insulated therefrom, heavy heat insulation entirely incasing said cooking chambers and kettle except at the open sides of said chambers, an oil jacket contained within such insulation surrounding the three closed sides of the cooking chambers and having a portion of its wall common to said water kettle, downfolding hinged doors to each of said cooking chambers, insulation packing in said doors, and a separate heater element located in the bottom of each of said chambers consisting of a mass of metal which carries underneath it an electric resistance heater to which current may be supplied continuously thereby to maintain a store of heat within said chambers.

7. In an electric cooker, two superposed cooking chambers heat insulated by external packing and fitted with separate heating means, said means comprising for each of said chambers a heat storing block of metal having electrical resistance heating elements carried by its lower surface, supplementary folding heater units in either of said chambers and a protective metal shield overlying but electrically insulated from said folding units in one of said chambers.

8. An electric cooker comprising a metal lined cooking chamber or chambers incased in heat insulating material, a water kettle superposed over but separated by insulating material from one of said cooking chambers, an oil jacket surrounding said insulation about the sides and back of said cooking chamber or chambers and structurally connected by a common wall with said kettle; heat insulating packing surrounding said jacket and kettle, and filling, discharging, and venting fittings to said jacket and said kettle.

9. In an electric cooker, the means herein described for utilizing heat leakage through the insulation packing of a permanently heated cooking chamber, said means comprising an oil jacket contained in said packing, and a water kettle one of the walls of which is common to the oil jacket and transmits heat from said oil jacket to the water in said kettle.

In testimony whereof I have signed my name to this specification in the presence of two subscribing witnesses.

CLIFFORD WILLIAM WINTERBOTHAM.

Witnesses:
F. W. WATKINS,
A. E. WOOD.

Copies of this patent may be obtained for five cents each, by addressing the "Commissioner of Patents, Washington, D. C."